Feb. 13, 1951 W. BRUBAKER 2,541,200
REATTACHABLE GASOLINE HOSE COUPLING
Filed March 20, 1946

INVENTOR.
WILLIAM BRUBAKER
BY Richey & Watts
ATTORNEYS

Patented Feb. 13, 1951

2,541,200

UNITED STATES PATENT OFFICE 2,541,200

REATTACHABLE GASOLINE HOSE COUPLING

William Brubaker, Wooster, Ohio, assignor to Akron Brass Manufacturing Company, Inc., Wooster, Ohio, a corporation of Ohio Application March 20, 1946, Serial No. 655,804

2 Claims. (Cl. 285—86)

This invention relates to hose couplings, and more specifically to a re-attachable gasoline hose coupling.

An object of the invention is to provide a coupling which is leakproof.

Another object is to provide a coupling which will hold securely against pressure sufficient to burst a tank wagon hose.

Another object is to provide a coupling which will tighten if the hose tends to creep or slip.

A further object is to provide a coupling which may be easily applied without special tools.

A still further object is to provide a coupling which will not damage the hose, and may be reapplied if removed.

Other objects and advantages, and the manner in which the various objects are realized, will appear in the following description, which, considered in connection with the accompanying drawings, sets forth the preferred embodiment of the invention.

In the drawings in which the preferred embodiment of the invention is illustrated:

The fitting consists of three parts; a body 1, a threaded collar 2, and a grip ring 3. The hose is indicated at 4.

Figure 2:
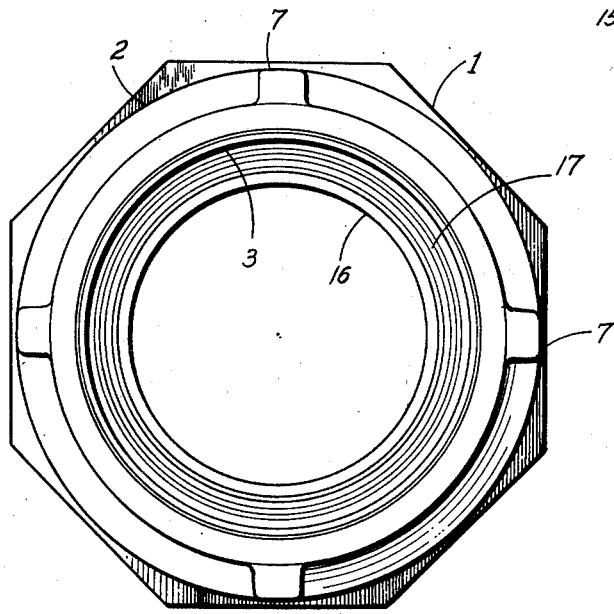
Fig. 2 is a view of the coupling from the hose end.

The body is threaded at 5 for engagement with a mating fitting. The body and collar have external and internal threads, respectively, shown at 6, by means of which the collar may be run up on the body. Ribs 7 are provided on the collar, and the central portion 8 of the body is octagonal, as shown in Fig. 2, to provide for the application of wrenches.

The grip ring 3 is compressed by turning up collar 2 on body 1.

To accomplish this, the inner surface 9 of the collar and the outer surface 10 of the grip ring are tapered, an angle of about eight degrees being found satisfactory. A slot 11 is cut in the grip ring to permit compression. This slot is in a plane inclined about 30 degrees to the axis of the coupling.

The face 13 of the body, with which the ring engages, is conical, being cut at an angle to the axis. An angle of about 80 degrees to the axis gives good results. This is an important feature of the invention, as it eliminates binding between the grip ring and body portions of the device as the ring is compressed, and causes the ring to move axially a small amount. This axial movement improves the gripping action of the fitting.

The face 12 of the ring, which engages the face 13 of the body, is formed so as to engage face 13 only at the outer edge of face 12. Face 12 may be approximately perpendicular to the axis, or may be beveled in the opposite direction to face 13. The line contact between the ring and body is very effective in obtaining good sealing action and minimizing the possibility of leaks.

Figure 1:
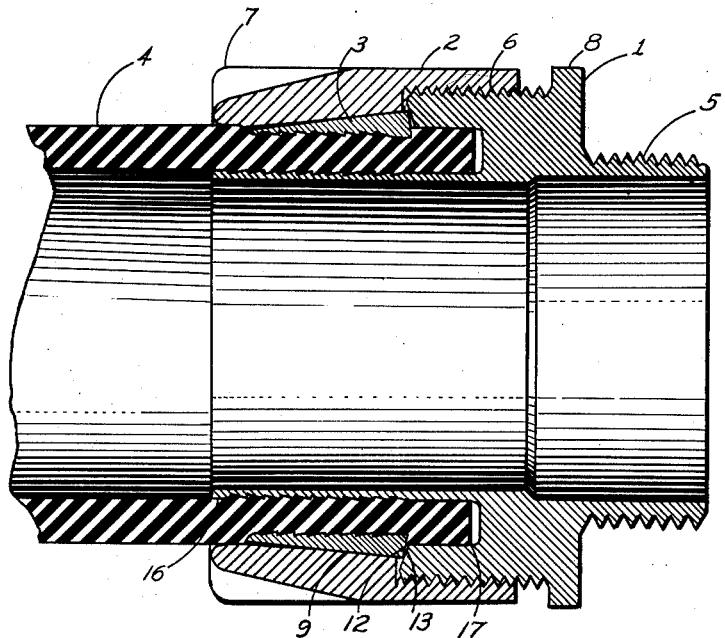
Fig. 1 is a longitudinal section of the coupling with a hose in place.
Figure 3:
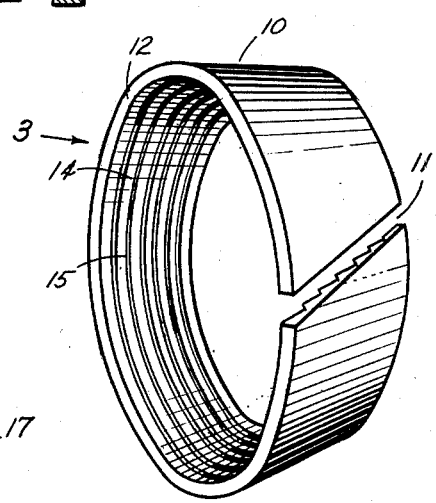
Fig. 3 is a perspective view of the grip ring.

The inner surface of the ring is provided with grooves 14, Fig. 3, for improved gripping action. These grooves are almost contiguous, but there are narrow lands 15 between them. As can be seen from Fig. 1, the left-hand edge of each groove is cut radially, the right-hand edge at an angle of about 15 degrees to the axis. These values have been found satisfactory, but they may, of course, be varied to suit the characteristics of a particular hose.

The portion 16 of the coupling is in the form of a thin-walled cylinder, grooved in the same manner on its outer surface as the ring 15 is grooved on its inner surface.

The hose 4 is compressed between the inner surface of the ring 2 and the outer surface 16 of the coupling. The end of the hose 4 extends into the annular recess 17 in the body. In this way, the clamping action of the ring 3 is exerted at a little distance from the end of the hose, and there is much less tendency to cause splitting, fraying, or other damage to the hose.

To apply the fitting, the collar 2 and ring 3 are slipped over the end of the hose, and the end of the hose is slipped over portion 16 of the coupling and into the annular recess 17. The grip ring is slid up against the coupling, and the collar is turned up tight by means of a wrench, compressing ring 2 and the end of hose 4.

By virtue of the shape of the grooves in the coupling and ring, the hose is held with great firmness. If the hose is subjected to tension, the tendency is to move the ring 2 further into the tapered hole of the collar, increasing the tightness of the grip.

By shaping the grooves in accordance with the invention, as described above, damage to the hose is eliminated, and the coupling may be removed and reapplied if desired.

While the foregoing description is necessarily of a specific character, in order that the invention may be completely set forth, it is to be understood that the specific terminology is not intended to be restrictive or confining, and that various modification of detail and rearrangements of parts may be resorted to without departing from the scope or spirit of the invention as herein claimed.

I claim:

1. A hose coupling comprising a body, a compressible gripping member, and a compression member, said body including an annular portion adapted to surround the hose end and formed with a reentrant face, said gripping member being adapted to enclose the hose adjacent the annular portion of the body and being formed with a grooved inner surface, a generally conical outer surface, and a face more radial than the reentrant face adapted for outer edge contact with the reentrant face of the body, and said compression member being formed with a generally conical inner surface disposed against the outer surface of the gripping member, whereby movement of the compression member toward the body compresses the gripping member and advances it slightly into the reentrant face.

2. A hose coupling comprising a body member formed with an annular recess for reception of the terminal portion of a hose; a gripping ring adapted to embrace the hose adjacent the recess; and a nut member in threaded engagement with the body member; the ring being compressible radially to grip the hose by movement of the nut member toward the body member through cooperation of a relatively slightly tapered outer surface of the ring with a mating surface on one of the members; a relatively steeply tapered reentrant annular face being formed on the other of the said members, the face being too steeply tapered to materially affect compression of the ring; and an end face of the ring being formed more nearly radial than the said reentrant face to engage with the said reentrant face at the outer edge of the said end face to effect line contact between the ring and the face of the member and to admit limited axial movement of the ring as it is compressed.

WILLIAM BRUBAKER.

REFERENCES CITED

The following references are of record in the file of this patent:

UNITED STATES PATENTS

| Number | Name | Date |
|---|---|---|
| 418,906 | Bosworth | Jan. 7, 1890 |
| 2,152,537 | Couty | Mar. 28, 1939 |

FOREIGN PATENTS

| Number | Country | Date |
|---|---|---|
| 485,154 | Great Britain | May 16, 1938 |